United States Patent

[11] 3,578,948

[72] Inventors Aaron L. Friend;
Arthur G. Patterson; James G. Wilen,
Phoenix, Ariz.
[21] Appl. No. 808,573
[22] Filed Mar. 19, 1969
[45] Patented May 18, 1971
[73] Assignee General Electric Company

[54] SOLDERING AND DESOLDERING HAND TOOL EMPLOYING AIR BLAST OR SUCTION
24 Claims, 7 Drawing Figs.

[52] U.S. Cl. ........................................... 219/230,
15/339, 15/409, 228/20
[51] Int. Cl. .................................................. B23k 3/06
[50] Field of Search ..................................... 219/230,
231; 228/19—21, 51—55; 15/313, 330, 339,
345—347, 408, 409

[56] References Cited
UNITED STATES PATENTS

| | | | |
|---|---|---|---|
| 1,078,512 | 11/1913 | Mills.......................... | 15/409X |
| 1,189,735 | 7/1916 | Quintin ....................... | 219/230UX |
| 2,602,180 | 7/1952 | Miller.......................... | 219/230UX |
| 2,609,778 | 9/1952 | Bleam et al. ................. | 219/230X |
| 2,955,188 | 10/1960 | Campo......................... | 219/230X |
| 3,023,295 | 2/1962 | Johnson ...................... | 219/230 |
| 3,163,145 | 12/1964 | Duhaime et al............... | 228/20 |

*Primary Examiner*—R. F. Staubly
*Attorneys*—David M. Schiller, Arthur E. Faurnier, Jr., Frank L. Neuhauser and Oscar B. Waddell

ABSTRACT: A soldering and desoldering device includes a heating unit and a soldering tip having an end for engagement with a soldered joint and having a first passage opening at its end. A second passage is provided having an exit opening and communicating with the first passage such that pressure fluid flowing through the second passage out the exit opening is effective to aspirate air from the first passage. Means including a manually actuatable valve are provided for controllably supplying pressure fluid from a source of pressure fluid to the second passage. An adjustable device is mounted for adjustment between a first position wherein it prevents pressure fluid from leaving the exit opening and causes it to flow through the first passage out the end of the soldering tip, and a second position wherein it permits pressure fluid to flow out the exit opening to aspirate air from the first passage. A container is mounted by the adjustable device to form therewith a unitary structure, the container receiving molten solder which passes through the first passage and the exit opening from the soldered joint in response to actuation of the valve when the adjustable device is in its second position. The container is formed of a thermoplastic material, such as the material known as Teflon, having a nonstick finish to prevent adherence of solder to the inner walls of the container.

Patented May 18, 1971
3,578,948
2 Sheets-Sheet 1
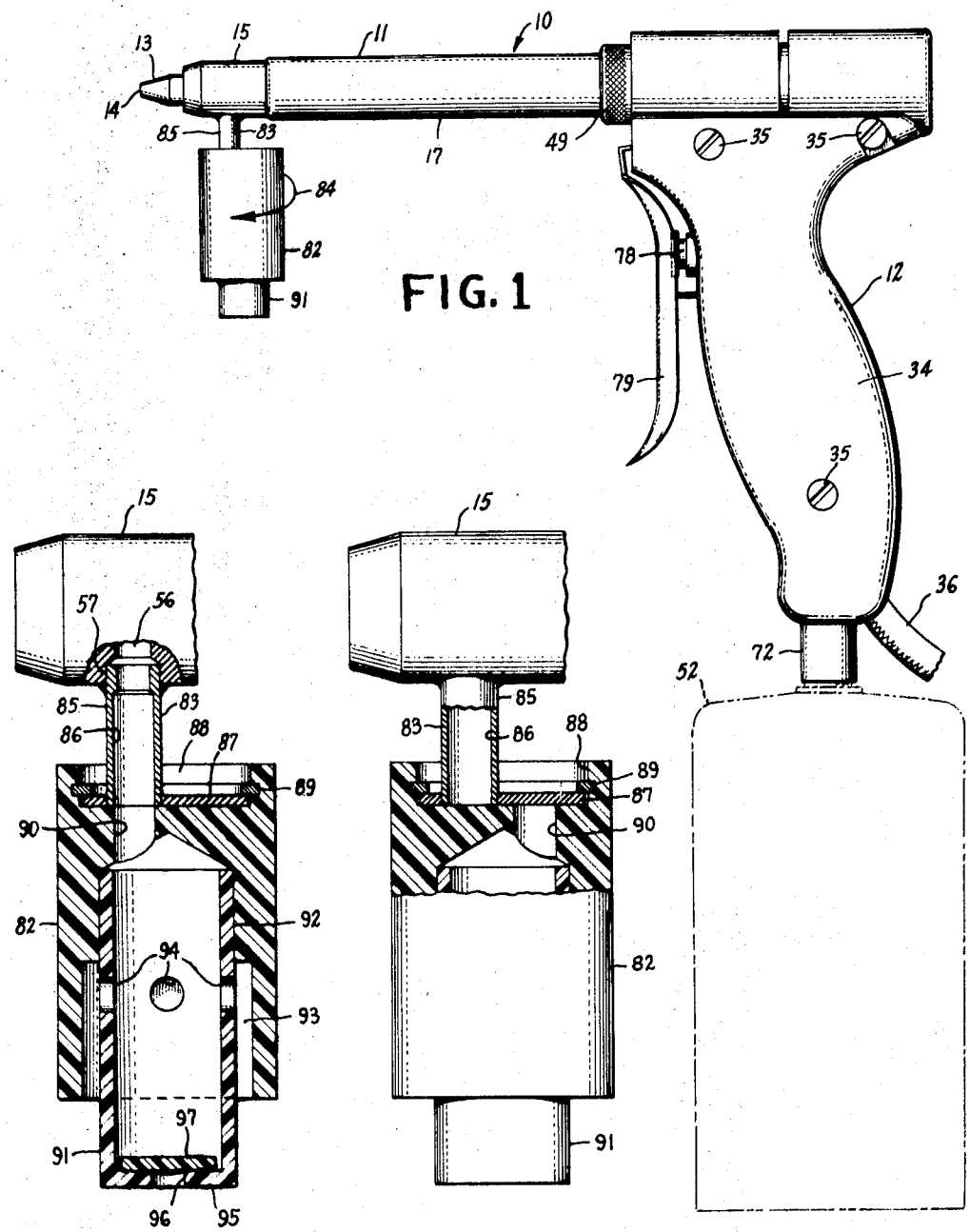
INVENTORS
AARON L. FRIEND,
ARTHUR G. PATTERSON,
JAMES G. WILEN
BY David M. Schiller
ATTORNEY Patented May 18, 1971

INVENTORS
AARON L. FRIEND,
ARTHUR G. PATTERSON,
JAMES G. WILEN

BY David M. Schiller

ATTORNEY 3,578,948

SOLDERING AND DESOLDERING HAND TOOL EMPLOYING AIR BLAST OR SUCTION

BACKGROUND OF THE INVENTION

1. Field of the invention

This invention relates to soldering and desoldering devices, and more particularly to portable hand operable soldering and desoldering devices.

2. Description of the Prior Art

There are frequent occasions when it becomes necessary to desolder soldered joints to permit separation of the joined parts. Such desoldering requires means to melt the solder and to remove the melted solder from the joint and these operations can become very time consuming and tiresome, particularly in those cases where numerous joints must be desoldered such for example as joints between integrated circuit modules and a printed circuit board. It is evident from the foregoing that there is a great need for a compact and inexpensive device capable of rapidly and safely performing desoldering operations with a minimum of operator effort. A desoldering device should therefore be easily portable and operable by single hand manipulation, and also should be capable of use as a conventional soldering iron. In addition, provision should be made for removing molten solder from a soldered joint either by a blowing action or by a suction action as desired by the operator. Further, the heating unit of the device should be readily removable for replacement or repair.

While attempts have previously been made to design soldering and desoldering devices, these prior art devices for the most part have not been entirely satisfactory in that they have omitted one or more of the above desirable features. For example, one known prior art desoldering device includes an aspirator bulb which must be repeatedly squeezed and released by an operator and the device does not readily lend itself to single hand operation. Another known device includes means for sucking molten solder from a joint by action of a pressure fluid but makes no provision for removing solder by a blowing action.

OBJECTS OF THE INVENTION

It is therefore an object of the invention to provide a novel and improved soldering and desoldering device of compact and inexpensive construction which is readily portable and capable of single hand operation.

It is another object of the invention to provide a device of such character which operates either by aspirating action to suck molten solder from a soldered joint through the soldering tip or by blowing action to eject molten solder from the joint and also to clean the soldering tip when necessary.

It is a further object of the invention to provide such a device which incorporates a container for receiving molten solder sucked from the joint by aspirating action and which is readily cleanable and reuseable for prolonged periods of time.

It is still another object of the invention to provide a device of the character described which includes an electric heating unit arranged for ready removal from the device housing for replacement or repair.

SUMMARY OF THE INVENTION

In carrying out the invention in one preferred form, a soldering and desoldering device is provided comprised of an electric heating unit for heating a soldering tip which includes a free end adapted for engagement with a soldered joint and having a first passage extending from the free end. Means are provided to define a second passage which has an exit opening and which is in communication with the first passage such that pressure fluid flowing through the second passage out the exit opening aspirates air from the first passage. Means including a manually actuatable valve are provided for controllably supplying pressure fluid from a source of pressure fluid to the second passage. An adjustable device is provided for adjustment between a first position wherein it prevents pressure fluid from flowing out the exit opening so as to cause pressure fluid to flow out the first passage, and a second position wherein it permits pressure fluid to flow out the exit opening to aspirate air from the first passage. A container is disposed adjacent the exit opening for receiving molten solder which is withdrawn from a soldered joint through the first passage and the exit opening by aspirating action.

BRIEF DESCRIPTION OF THE DRAWING

FIG. 1 is a side elevational view of a soldering and desoldering device in accord with the present invention, a suitable source of pressure fluid being shown in dashed lines attached to the device;

FIG. 2 is a partial side elevational view of the device of FIG. 1 with parts in section showing the container for receiving molten solder and the adjustable device in a position to permit withdrawal of molten solder from a workpiece into the container by aspirating action;

FIG. 3 is a view similar to FIG. 2 showing the adjustable device in a different position from that shown in FIG. 2 to cause pressure fluid to pass out the soldering tip;

DESCRIPTION OF A PREFERRED EMBODIMENT

Figures 4, 5, 6, 7:
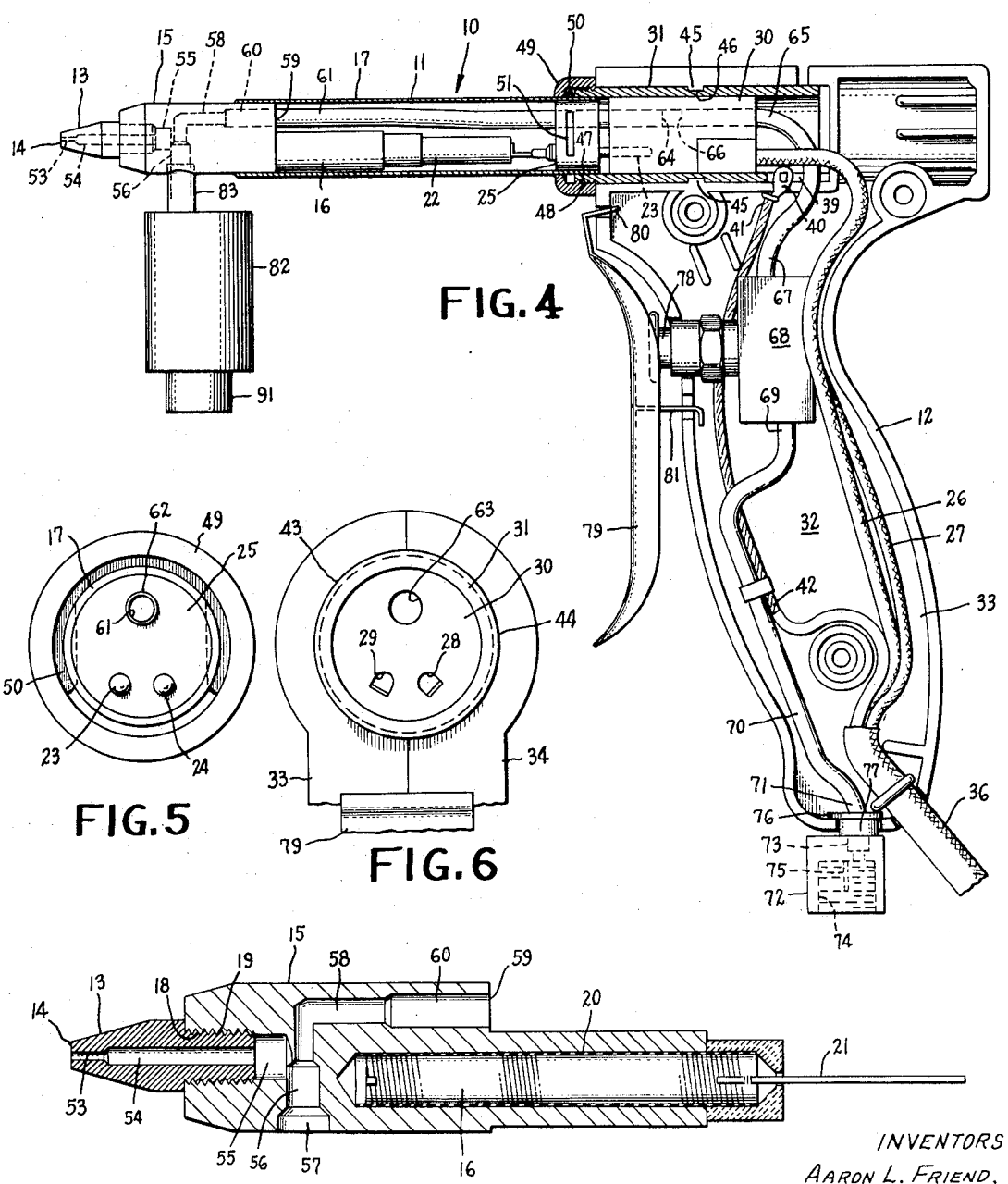
FIG. 4 is a side elevational view of the device of FIG. 1 with parts shown in section and parts removed to shown the interior of the device housing.
FIG. 5 is an end elevational view of the barrel assembly of the device shown in FIGS. 1 and 4.
FIG. 6 is a partial end elevational view of the handle assembly of the device shown in FIGS. 1 and 4.
FIG. 7 is a side elevational view with parts shown in section of the head containing the heating unit and the soldering tip attached to the head.

Referring now to the drawing, the improved soldering and desoldering device of the present invention is shown in FIG. 1 as including a housing represented generally by the numeral 10 and preferably comprised of a barrel assembly 11 detachably secured at its right-hand end as viewed in FIG. 1 to a hollow pistol grip-shaped handle assembly 12. The barrel assembly 11 at its left-hand end carries a soldering tip 13 with an end 14 adapted to be applied to a soldered joint (not shown).

As best shown in FIG. 4 the barrel assembly 11 includes a head 15 which releasably retains a suitable electric heating unit 16 and includes also a hollow tubular shield 17 which receives a portion of the head 15 and which is brazed or otherwise secured to the head 15. The soldering tip 13 is secured to the head 15 in any suitable manner and preferably is detachably secured thereto as by a threaded engagement shown in FIG. 7. As there shown, the tip 13 includes at its attached end external threads 18 which threadably engage internal threads 19 formed in a bore at the attached end of the head 15. In order to releasably retain the heating element 16, the head 15 includes an elongated passage 20 which frictionally receives the heating element 16 in close proximity to the soldering tip 13. The head 15 and the tip 13 are formed of good heat conducting material such as steel so that heat generated by the heating element 16 is rapidly transferred through the head 15 to the soldering tip 13. While it is preferred that the device incorporate an electric heating unit, it is to be understood that any suitable heating means may be employed for heating the tip 13.

In order to connect the heating element 16 to a source of electrical energy (not shown), the heating element 16 includes a pair of spaced terminals 21, one of which is shown in FIG. 7, which are preferably encased in a suitable potting compound 22 and which are connected to protruding ends of conductive pins 23 and 24 shown in FIG. 5 retained in spaced passages formed in an insulator 25 which is frictionally removably mounted within the shield 17 adjacent the right-hand end thereof as viewed in FIG. 4. In order to detachably and electrically connect the pins 23 and 24 to electrical conductors 26 and 27 within the handle assembly 12, the pins 23 and 24 have protruding ends at the right-hand end of the barrel assembly 11 as viewed in FIG. 4 which extend beyond the corresponding end of shield 17 into frictional engagement with conductive sockets 28 and 29 retained within spaced openings of an insulator 30 secured within a hollow bushing 31 attached to the handle assembly 12 as shown in FIG. 6. The opposite ends of the sockets 28 and 29 receive terminal ends of the insulated conductors 26 and 27 which extend within a cavity 32 defined by two separable handle sections 33 and 34 detachably secured together in any suitable manner as by screws 35 to form the handle assembly. The conductors 26 and 27 at their lower ends as viewed in FIG. 4 are contained within an insulating sheath 36 which extends through an opening defined by the handle sections 33 and 34 to a terminal plug (not shown) connectable to a suitable source of electrical energy. The soldering and desoldering device is preferably grounded and for this purpose the bushing 31 is formed of a suitable metallic material and is slotted at its right-hand end as viewed in FIG. 4 to define an edge 39 to which is secured as by spot welding a terminal 40 attached to the bare end 41 of a grounded conductor 42 extending into the sheath 36.

In order to retain the bushing 31 in operative position, the handle sections 33 and 34 include at their upper ends as viewed in FIG. 6 semicylindrical depressions 43 and 44 which when the handle sections are secured together, define a cylindrical passage in which the bushing 31 is located. In order to prevent axial movement of the bushing 31 relative to the handle sections 33 and 34, a rib 45 on each handle section extends inwardly into engagement with a complimentary annular groove 46 formed in the bushing 31.

Any suitable arrangement may be employed for detachably securing the barrel assembly 11 to the handle assembly 12. In the preferred embodiment the bushing 31 is provided at its left-hand end as viewed in FIG. 4 with external threads 47 adapted to engage internal threads 48 formed on a gland nut 49 which surrounds the shield 17 and which is held captive thereon. The nut 49 is retained on the shield 17 by means of a generally C-shaped retaining ring 50 which surrounds a portion of the shield 17 and which engages a pair of circumferentially spaced slots which are formed in the wall of the shield 17, one such slot being designated by the numeral 51 in FIG. 4. With such slot arrangement, the insulator 25 and the heating unit 16 can be readily removed from the shield 17 and the head 15 when the barrel assembly 11 is detached from the handle assembly 12.

The soldering and desoldering device is adapted for connection to a suitable source of pressure fluid which may for example comprise a conventional aerosol can containing fluid such as Freon under pressure and represented by the dashed lines 52 in FIG. 1, or a conventional supply of shop air (not shown). The invention provides means whereby the device is selectively operable either to supply pressure fluid out of the soldering tip 13 for ejecting molten solder away from a soldered joint, or to suck molten solder from a soldered joint through the soldering tip 13. To this end the soldering and desoldering device includes fluid conducting passage means adapted for connection to the source of pressure fluid with a convenient adjustment for selectively changing the path of flow of pressure fluid through the passage means to permit either a blowing or sucking operation as desired.

The fluid conducting passage means may be of any suitable form and in the preferred embodiment illustrated, the fluid conducting passage means comprises a first passage 53 which as shown in FIG. 7, opens at the end 14 of the soldering tip 13 and leads to a longer enlarged passage 54 terminating at the opposite end of the tip 13. The barrel assembly 11 contains additional passage means including a second passage in the head 15 comprised of a short passage 55 communicating with the passage 54 in the tip 13, a vertical solder conducting passage 56 as viewed in FIG. 7 which communicates with the passage 55 and which includes an enlarged exit opening 57 at a surface of the head 15, and a horizontal passage 58 disposed at the upper region of the head 15 in communication with the passage 56 and terminating at an intermediate vertical face 59 of the head 15. The passage 58 includes an enlarged terminal portion 60 adapted to receive one end of a tube 61 shown in FIG. 4 which extends through the shield 17, through a passage 62 formed in the insulator 255 and into a passage 63 formed in the insulator 30 where the tube 61 terminates at its end 64. As shown in FIG. 4, an additional tube 65 has an end 66 positioned within the passage 63 from its opposite end so as to be in communication with the tube 61. The other end 67 of the tube 65 is connected to one side of a valve 68 the other side of which is connected to an end 69 of a tube 70 having its opposite end 71 connected to an adapter 72 which includes an orifice 73 communicating with an enlarged threaded opening 74 containing a depending pin 75. The adapter 72 is designed to receive the threaded end of a conventional aerosol can 52 containing pressurized fluid such as Freon or alternatively, to receive the threaded end of a hose leading to a supply of pressurized air such as is usually available in factories and the like. The adapter 72 is located at the lower end of the handle assembly 12 externally thereof to be readily accessible for connection to a suitable source of pressurized fluid and includes a flange 76 engaging inner surfaces of the two handle sections 33 and 34, the flange 76 being connected to an intermediate section 77 which fits in complementary apertures of the handle sections 33 and 34 for positioning and retaining the adapter 72.

In order to actuate the valve 68 for controlling the supply of pressure fluid from a source of pressure fluid to the above-described fluid conducting passage means, the valve 68 includes a spring biased reciprocable stem 78 which is located externally of the handle assembly 12 for manual reciprocation. The stem 78 is illustrated in FIG. 4 in an outwardly extended first position wherein it is effective to close the valve 68 so as to prevent the flow of pressure fluid from the source of pressure fluid. Depression of the stem 78 toward the right as viewed in FIG. 4 against the spring bias displaces the stem to a second inwardly disposed position wherein the valve 68 is open to permit the flow of pressure fluid through the various fluid conducting passages from the source of pressure fluid. The stem 78 may be actuated directly by an operator or by intermediate means such as a trigger 79 which is mounted for pivotal movement by means of projections 80 and 81 extending through openings of the handle assembly.

In accord with the invention adjustable means are provided to control the flow of pressure fluid through the fluid conducting passages in a manner providing either a blowing action whereby pressure fluid passes out the soldering tip 13 to eject molten solder away from a soldered joint, or an aspirating action whereby molten solder is sucked through the soldering tip. The adjustable means includes a device which is movable between two positions wherein it respectively prevents pressure fluid from leaving the exit opening 57 and permits pressure fluid to leave the exit opening. The adjustable means is best described with reference to FIGS. 2 and 3 and is preferably in the form of a hollow tubular member 82 supported by a manifold assembly 83 for rotation as indicated by the arrow 84 of FIG. 1. The manifold assembly 83 includes a hollow tube 85 which is attached to the head 15 with one end of the tube 85 within the exit opening 57 such that the passage 56 communicates with the passage 86 of the tube 85. The other end of the tube 85 is attached to a circular plate 87 which is loosely received within a circular opening 88 of the member 82, the manifold assembly 83 being attached to the member 82 by means of a ring 89 overlying the plate 87 and disposed within an annular recess of the sidewall of the opening 88. The tube 85 projects through an opening of the plate 87 to bear against the base of the opening at an area laterally displaced from the central axis of the member 82. With the arrangement described the member 82 is rotatable about its central vertical axis as viewed in FIG. 2 relative to the manifold assembly 83.

In order to effectively open and close the exit opening 57 in response to rotation of the member 82, the member 82 includes a passage 90 which is parallel to the central longitudinal axis of the member 82 and which is eccentrically displaced therefrom. The angular position of the member 82 shown in FIG. 2 is such that the passage 90 is vertically aligned with the passage 86 of the tube 85 so that pressure fluid is permitted to flow out the exit opening 57 and through the passages 86 and 90. This position of the member 82 therefore results in molten solder being sucked from a soldered joint through the passages 53 and 54 of the soldering tip 13 and out the exit opening 57 by aspirating action created by pressure fluid flowing through passage 56 and out the exit opening 57. In order to establish a condition wherein pressure fluid flows out the soldering tip 13, it is only necessary to rotate the member 82 about its axis from its position shown in FIG. 2 to a position wherein the passage 90 is misaligned in relation to the passage 86 as shown in FIG. 3. For this position of the member 82 the exit opening 57 is blocked by the base of the opening 88 such that pressure fluid will flow through the passages 58, 55, 54 and 53 and out the soldering tip 13.

In order to receive molten solder which is withdrawn from a soldered joint through the soldering tip 13 by aspirating action, the invention provides a container 91 carried by the hollow tubular member 82 to provide a unitary structure. As shown in FIG. 2, the container 91 includes an open upper end and a closed lower end and is positioned with a friction fit within a restricted passage 92 formed in the member 82 and which communicates with the passage 90. The open upper end of the container 91 faces the passage 90 and is in communication therewith. The member 82 includes an enlarged passage 93 adjacent the restricted passage 92 such that there is clearance between the outer surface of the container 91 and the inner surface of the passage 93. The container 91 includes a plurality of openings 94 spaced about its periphery and communicating with the passage 93 to permit the escape of pressure fluid entering the container 91 through the aligned passages 86 and 90 when the member 82 is positioned as shown in FIG. 2.

The member 82 and the container 91 may be formed of any suitable material and in the preferred embodiment of the invention both the member 82 and the container 91 are formed of a thermoplastic material such as for example the material sold under the trademark Teflon. A thermoplastic material is preferred over a metallic material for example because it is a relatively poor conductor of heat thus permitting manual manipulation of the member 82 and the container 91 when the heating unit 16 is energized. It is also relatively inexpensive such that the member 82 and the container 91 can be inexpensively replaced as needed. Such material also provides a nonstick finish so that solder received by the container 91 will not adhere to the inner surfaces of the container 91 and can be readily removed therefrom in a hardened condition.

In order to permit easy removal of hardened solder from the container 91, the closed end thereof includes an end wall 95 having an aperture 96 therein and a removable member 97 in the form of a small circular disc preferably also formed of a thermoplastic material is freely positioned in the container 91 to overlie the aperture 96 as shown in FIG. 2. To remove hardened solder form the container 91 it is only necessary to withdraw the container 91 out of engagement with the member 82 and to insert a suitable tool through the aperture 96 from the closed end to effect removal of the disc 97 from the container 91 thus removing hardened solder from the container and also permitting removal of solder from the disc 97.

In operation, when it is desired to desolder a soldered joint, the soldering and desoldering device is attached to a suitable source of pressure fluid such as the aerosol can 52 shown in FIG. 1 or a conventional air hose by means of the adapter 72. The cable containing conductors 26, 27 and 42 is then connected to a suitable source of electrical energy to effect energization of the electric heating unit 16. When the temperature of the tip 13 has been elevated above the melting point of solder, the tip 13 is applied to a soldered joint which is to be desoldered. When the solder has melted, the operator merely squeezes the trigger 79 which opens the valve 68 and permits pressure fluid to flow through the fluid conducting passages from the source of pressure fluid. Depending upon the adjusted position of the member 82, pressure fluid will either flow out the tip 13 to blow melted solder away from the joint, or flow out the exit opening 57 to withdraw solder from the joint by aspirating action through the tip 13 and out the exit opening 57 into the container 91. When the operator observes that the melted solder has been removed from the soldered joint sufficiently to permit separation of the connected parts, he releases the trigger 79 which closes the valve 68 and terminates flow of pressure fluid from the source of pressure fluid.

It is generally preferred that the member 82 be adjusted to its position illustrated in FIG. 2 so that melted solder is withdrawn into the container 91. However, in certain situations it will be desirable to adjust the member 82 to its position shown in FIG. 3 to effect flow of pressure fluid out the tip 13 to blow melted solder away from the solder joint. Such blowing action is also effective to clean the tip 13. Of course, the soldering and desoldering device is readily employed as a conventional soldering iron in which case there is no need for a source of pressure fluid in association with the device.

It is thus seen that the invention provides a portable, safe and easily operable soldering and desoldering device which can be employed either as a conventional soldering device or as a desoldering device which effects removal of melted solder from a soldered joint by blowing action or by an aspirating action wherein the removed solder is withdrawn from the joint into a container carried by the device. A simple adjustment is provided to permit operation of the device in either its blowing or aspirating mode. The solder container is designed for prolonged usage inasmuch as solder contained therein can be ready removed without damage to the container. Also, the design is such as to permit readily removal of the heating unit 16 for purposes of replacement or repair.

Although the invention has been described with reference to certain specific embodiments thereof, numerous modifications are possible and it is desired to cover all modifications falling within the spirit and scope of the invention.

We claim:

1. A soldering and desoldering device comprising in combination;

a housing including an elongated body, a soldering tip at one end of said elongated body adapted to be heated by a heat source, said soldering tip having a first end adapted to engage a workpiece and having a first passage opening at its first end, means defining a second passage having an exit opening adjacent said soldering tip, said first and second passages being in communication such that pressure fluid flowing through said second passage and out said exit opening aspirates air from said first passage, said second passage including a solder conducting portion in said elongated body adjacent said soldering tip which extends transverse to said first passage and which conducts to said exit opening molten solder which is withdrawn by aspirating action through said first passage from a workpiece heated by said soldering tip, means including an actuatable valve carried by said housing for controllably supplying pressure fluid from a source of pressure fluid to said second passage, and means including an adjustable device carried by said elongated body adjacent said soldering tip for controlling the flow of pressure fluid through said first and second passages, said adjustable device being adjustable about an axis extending transverse to the longitudinal axis of said elongated body between a first position wherein it prevents pressure fluid from flowing out said exit opening to cause pressure fluid to flow through said first passage out said first end of said soldering tip, and a second position wherein it permits pressure fluid to flow out said exit opening to effect aspiration of air from said first passage.

2. A device as defined in claim 1 including a container having an open end and a closed end and positioned with said open end adjacent said exit opening, said container receiving molten solder which is withdrawn by aspirating action through said first passage and said exit opening from a workpiece heated by said soldering tip when said adjustable device is in its second position and when said valve is actuated.

3. A device as defined in claim 2 wherein the closed end of said container comprises an end wall having an aperture, and a removable member overlying said end wall within said container, said container and removable member being formed of a thermoplastic material.

4. A soldering and desoldering device comprising in combination;
   a soldering tip adapted to be heated by a heat source, said soldering tip having a first end adapted to engage a workpiece and having a first passage opening at its first end,
   means defining a second passage having an exit opening, said first and second passages being in communication such that pressure fluid flowing through said second passage and out said exit opening aspirates air from said first passage,
   means including an actuatable valve for controllably supplying pressure fluid from a source of pressure fluid to said second passage,
   means including an adjustable device comprising a first hollow member having a passage opening at one end thereof for controlling the flow of pressure fluid through said first and second passages, said first member being supported for rotation between a first position wherein its passage is misaligned with said exit opening to prevent pressure fluid from flowing out said exit opening to cause pressure fluid to flow through said first passage out said first end of said soldering tip, and a second position wherein its passage is aligned with said exit opening to permit pressure fluid to flow out said exit opening to effect aspiration of air from said first passage, and
   a container comprising a second hollow member having an open end and a closed end, said second member extending into said first member with said open end facing the passage of said first member adjacent said exit opening, said container receiving molten solder which is withdrawn by aspirating action through said first passage and said exit opening from a workpiece heated by said soldering tip when said adjustable first member is in its second position and when said valve is actuated.

5. A device as defined in claim 4 wherein said first and second members are formed of a thermoplastic material, said first member having an internal shoulder defining adjacent enlarged and reduced passages, said second member being frictionally received in said reduced passage with clearance between the outer surface of said second member and the inner surface of said enlarged passage, said second member having a plurality of openings spaced circumferentially about its axis, the closed end of said second member comprising an end wall having an aperture, and a removable member overlying said end wall within said second member.

6. A soldering and desoldering device comprising in combination;
   a housing including a barrel assembly and a pistol grip handle assembly attached to said barrel assembly adjacent one end thereof,
   an electric heating unit within said barrel assembly,
   a soldering tip at the other end of said barrel assembly to be heated by said heating unit, said soldering tip having a first end adapted to engage a workpiece and having a first passage opening at its first end,
   first means defining a second passage having an exit opening adjacent said soldering tip, said first and second passages being in communication such that pressure fluid flowing through said second passage and out said exit opening aspirates air from said first passage, said second passage including a solder conducting portion in said barrel assembly adjacent said soldering tip which extends transverse to said first passage and which conducts to said exit opening molten solder which is withdrawn by aspirating action through said first passage from a workpiece heated by said soldering tip,
   second means including an actuatable valve carried by said housing for controllably supplying pressure fluid from a source of pressure fluid to said second passage, said valve including a reciprocable spring biased stem exposed adjacent said handle assembly for manual reciprocation to actuate said valve, and
   third means including an adjustable device carried by said barrel assembly adjacent said soldering tip for controlling the flow of pressure fluid through said first and second passages, said adjustable device being adjustable about an axis extending transverse to the longitudinal axis of said barrel assembly between a first position wherein it prevents pressure fluid from flowing out said exit opening to cause pressure fluid to flow through said first passage out said first end of said soldering tip, and a second position wherein it permits pressure fluid to flow out said exit opening to effect aspiration of air from said first passage.

7. A device as defined in claim 6 including a container having an open end and a closed end and positioned with said open end adjacent said exit opening, said container receiving molten solder which is withdrawn by aspirating action through said first passage and said exit opening from a workpiece heated by said soldering tip when said adjustable device is in its second position and when said valve is actuated.

8. A device as defined in claim 6 wherein said barrel assembly is removably attached to said handle assembly, said heating unit being removably retained in said barrel assembly and being removable therefrom when said barrel assembly is detached from said handle assembly.

9. A device as defined in claim 6 including an adapter connected to said second means and exposed for connection to a source of pressure fluid.

10. A soldering and desoldering device comprising in combination:
    a housing including a barrel assembly and a pistol grip handle assembly attached to said barrel assembly adjacent one end thereof,
    and electric heating unit within said barrel assembly,
    a soldering tip at the other end of said barrel assembly to be heated by said heating unit, said soldering tip having a first end adapted to engage a workpiece and having a first passage opening at its first end,
    first means defining a second passage having an exit opening, said first and second passages being in communication such that pressure fluid flowing through said second passage and out said exit opening aspirates air from said first passage,
    second means including an actuatable valve for controllably supplying pressure fluid from a source of pressure fluid to said second passage, said valve including a reciprocable spring biased stem exposed adjacent said handle assembly for manual reciprocation to actuate said valve,
    third means including an adjustable device comprising a first hollow member having a passage opening at one end thereof for controlling the flow of pressure fluid through said first and second passages, said first member being carried by said barrel assembly for rotation between a first position wherein its passage is misaligned with said exit opening to prevent pressure fluid from flowing out said exit opening to cause pressure fluid to flow through said first passage out said first end of said soldering tip, and a second position wherein its passage is aligned with said exit opening to permit pressure fluid to flow out said exit opening to effect aspiration of air from said first passage, and
    a container comprising a second hollow member having an open end and a closed end, said second member extending into said first member with said open end facing the passage of said first member adjacent said exit opening, said container receiving molten solder which is withdrawn by aspirating action through said first passage and said exit opening from a workpiece heated by said soldering tip when said adjustable first member is in its second position and when said valve is actuated.

11. A device as defined in claim 10 wherein said first and second members are formed of a thermoplastic material, said first member having an internal shoulder defining adjacent enlarged and reduced passages, said second member being frictionally received in said reduced passage with clearance between the outer surface of said second member and the inner surface of said enlarged passage, said second member having a plurality of openings spaced circumferentially about its axis, the closed end of said second member comprising an end wall having an aperture, and a removable member overlying said end wall within said second member.

12. A soldering and desoldering device comprising in combination;
  a housing including a barrel assembly and a pistol grip handle assembly removably attached to said barrel assembly adjacent one end thereof, said handle assembly comprising a pair of separable sections defining a cavity,
  an electric heating unit removably attached to said barrel assembly adjacent one end thereof, said handle assembly comprising a pair of separable sections defining a cavity,
  an electric heating unit removably retained within said barrel assembly, said heating unit having a pair of terminals,
  a first insulator removably retained within said barrel assembly adjacent said one end thereof, said first insulator containing a plurality of first bores,
  a pair of conductive pins within a pair of said first bores, said pins having first ends connected to the terminals of said heating unit and having second ends projecting beyond said one end of said barrel assembly,
  a first hollow tube within a third one of said first bores, said first tube having a first end within said barrel assembly and having a second end projecting beyond said one end of said barrel assembly,
  a soldering tip adjacent the other end of said barrel assembly to be heated by said heating unit, said soldering tip having a first end adapted to engage a workpiece and having a first passage opening at its first end,
  means in said barrel assembly defining a second passage having an exit opening, said first and second passages being in communication such that pressure fluid flowing through said second passage and out said exit opening aspirates air from said first passage, the first end of said first tube being in communication with said second passage,
  a bushing carried by said handle assembly, said bushing having a first end exposed externally of said handle assembly and a second end communicating with the cavity of said handle assembly,
  a second insulator within said bushing containing a plurality of second bores,
  a pair of conductive sockets within a pair of said second bores, said conductive sockets and a third one of said second bores releasably receiving respectively the second ends of said conductive pins and said first tube through the first end of said bushing,
  electrical conductors within the cavity of said handle assembly connected to said conductive sockets through the second end of said bushing and adapted for connection to a source of electrical voltage,
  second hollow tube means within the cavity of said handle assembly having first and second ends with its first end received within said third one of said second bores through the second end of said bushing, the second end of said second tube means being adapted for connection to a source of pressure fluid,
  a valve within the cavity of said handle assembly for controlling the supply of pressure fluid from said source of pressure fluid through said second tube means, said valve including a reciprocable spring-biased stem exposed for manual reciprocation to actuate said valve, and
  means including an adjustable device for controlling the flow of pressure fluid through said first and second passages, said adjustable device being adjustable between a first position wherein it prevents pressure fluid from flowing out said exit opening to cause pressure fluid to flow through said first passage out said first end of said soldering tip, and a second position wherein it permits pressure fluid to flow out said exit opening to effect aspiration of air from said first passage.

13. A device as defined in claim 12 including a container having an open end and a closed end and positioned with said open end adjacent said exit opening, said container receiving molten solder which is withdrawn by aspirating action through said first passage and said exit opening from a workpiece heated by said soldering tip when said adjustable device is in its second position and when said valve is actuated.

14. A device as defined in claim 12 wherein said bushing has external threads adjacent its first end, said barrel assembly having a circumferentially slotted area adjacent its one end, a retaining ring extending partially around said barrel assembly overlying said slotted area, and a nut around said barrel assembly in threaded engagement with said bushing threads, said ring retaining said nut on said barrel assembly.

15 A device as defined in claim 12 including an adapter connected to the second end of second tube means and exposed for connection to a source of pressure fluid.

16. A device as defined in claim 15 wherein said adjustable device comprises a first hollow member having a passage opening at one end thereof, said first member being carried by said barrel assembly for rotation between a first position wherein its passage is misaligned with said exit opening and a second position wherein its passage is aligned with said exit opening, said container comprising a second hollow member having an open end and a closed end, said second member extending into said first member with said open end facing the passage of said first member.

17. A device as defined in claim 16 wherein said first and second members are formed of a thermoplastic material, said first member having an internal shoulder defining adjacent enlarged and reduced passages, said second member being frictionally received in said reduced passage with clearance between the outer surface of said second member and the inner surface of said enlarged passage, said second member having a plurality of openings spaced circumferentially about its axis, the closed end of said second member comprising an end wall having an aperture, and a removable member overlying said end wall within said second member.

18. A soldering and desoldering device comprising in combination;
  a housing including an elongated body,
  an electric heating unit within said elongated body,
  a soldering tip at one end of said elongated body to be heated by said heating unit, said soldering tip having a first end adapted to engage a workpiece and having a first passage opening at its first end,
  first means defining a second passage having an exit opening adjacent said soldering tip, said first and second passages being being in communication such that pressure fluid flowing through said second passage and out said exit opening aspirates air from said first passage,
  second means including an actuatable valve carried by said housing for controllably supplying pressure fluid from a source of pressure fluid to said second passage, said valve including a reciprocable spring biased stem exposed for manual reciprocation to actuate said valve,
  a rigid, cylindrical container for receiving molten solder which is withdrawn by aspirating action through said first passage and said exit opening from a workpiece heated by said soldering tip, said container having an open end and a closed end and being formed of a thermoplastic material, and means at said one end of said elongated body providing a rigid support detachably suspending said container beneath said elongated body with the longitudinal axis of said container extending transverse to the longitudinal axis of said elongated body, said rigid support containing a cylindrical passage which communicates with said exit opening and which has an open end beneath said elongated body which receives said container with the sidewall of said passage in detachable frictional engagement with the external surface of the sidewall of said container at an area adjacent the open end of said container, said container having an opening in its sidewall which is clear of the area of engagement between said support and said container to permit the escape of pressure fluid entering said container.

19. A device as defined in claim 18 wherein the closed end of said container comprises an end wall having an aperture, and
a removable member overlying said end wall within said container, said removable member being formed of a thermoplastic material.

20. A soldering and desoldering device comprising in combination;
a housing including an elongated body,
a soldering tip at one end of said elongated body adapted to be heated by a heat source, said soldering tip having a first end adapted to engage a workpiece and having a first passage opening at its first end,
means defining a second passage having an exit opening adjacent said soldering tip, said first and second passages being in communication such that pressure fluid flowing through said second passage and out said exit opening aspirates air from said first passage,
means including an actuatable valve carried by said housing for controllably supplying pressure fluid from a source of pressure fluid to said second passage, and
a unitary structure carried by said elongated body adjacent said soldering tip for rotation relative to said elongated body to perform the dual function of selectively opening and closing said exit opening and of receiving molten solder which is withdrawn by aspirating action from a workpiece heated by said soldering tip through said first passage and said exit opening when the exit opening is open, said unitary structure including a first hollow member rotatably carried by said elongated body for opening and closing said exit opening, and a second container member having an open end and a closed end for receiving molten solder by aspirating action, said container member being detachably secured to said first member with said open end communicating with the hollow of said first member.

21. A device as defined in claim 20 wherein said unitary structure is carried by said elongated body for rotation about an axis extending transverse to the longitudinal axis of said elongated body.

22. A device as defined in claim 20 wherein the closed end of said container member comprises an end wall having an aperture, and a removable member overlying said end wall within said container member.

23. A device as defined in claim 20 wherein said first and second members are both formed of a thermoplastic material.

24. A device as defined in claim 20 wherein said container member is secured to said first member by frictional engagement therewith, said container member being installed and removed relative to said first member by movement of said container member along an axis extending transverse to the longitudinal axis of said elongated body.